June 2, 1931. F. L. CAPPS ET AL Re. 18,089
PICK-UP
Original Filed April 13, 1929
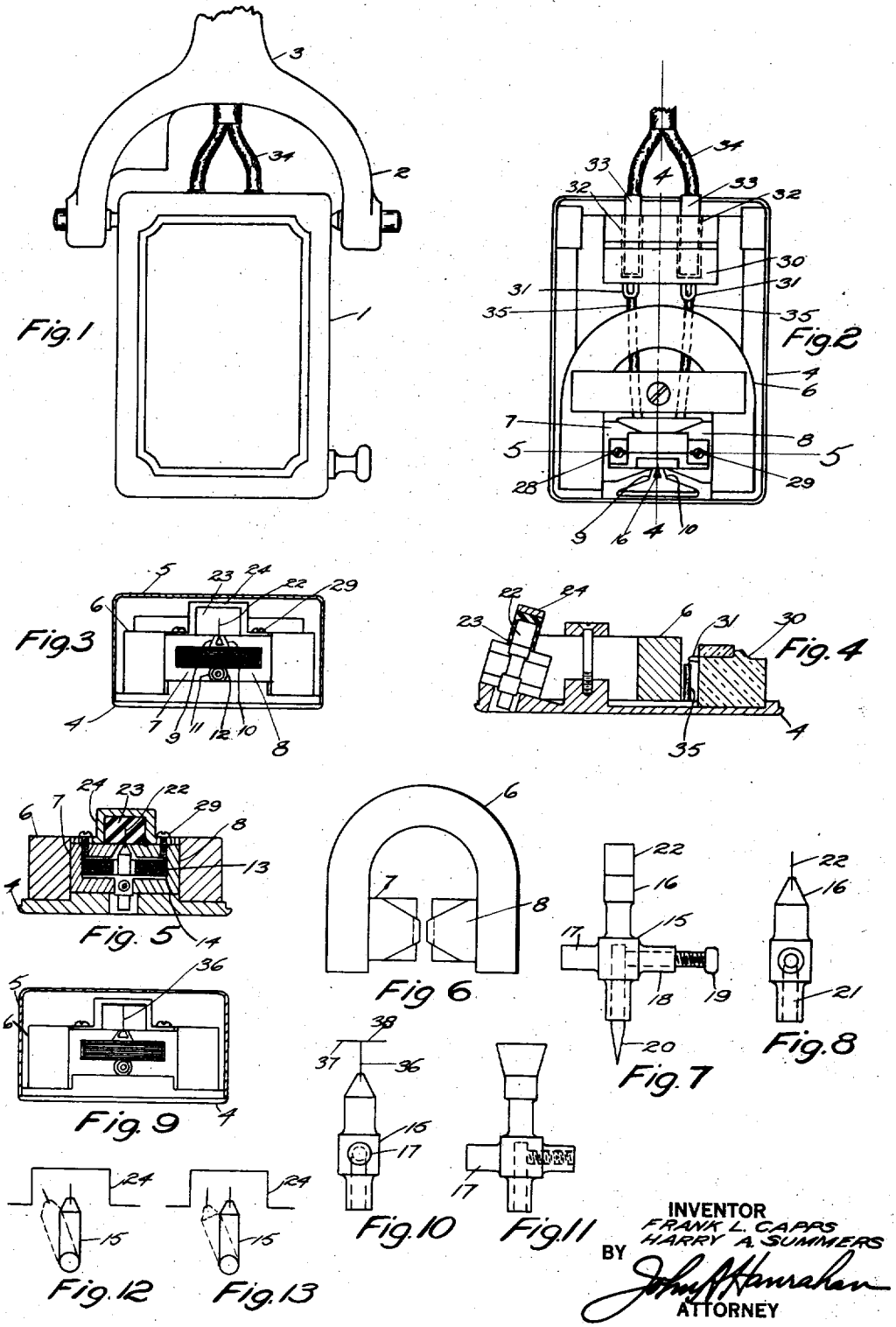
INVENTOR
FRANK L. CAPPS
HARRY A. SUMMERS
BY John A. Hanrahan
ATTORNEY Reissued June 2, 1931 Re. 18,089

UNITED STATES PATENT OFFICE

FRANK L. CAPPS, OF MILFORD, CONNECTICUT, AND HARRY A. SUMMERS, OF BROOKLYN, NEW YORK, ASSIGNORS TO COLUMBIA PHONOGRAPH COMPANY, INC., OF BRIDGEPORT, CONNECTICUT, A CORPORATION OF NEW YORK

PICK-UP

Original No. 1,760,114, dated May 27, 1930, Serial No. 354,854, filed April 13, 1929. Application for reissue filed August 6, 1930, Serial No. 473,419.

This invention relates to new and useful improvements in pick-ups for electric phonographs.

An object of the invention is to provide a pick-up, the armature of which is given a free balance and at the same time has its motion damped.

Another object is to provide an armature damping means comprising a single piece or block of rubber or similar material of predetermined size, the same being so applied and held in place that no adjustment for compression is necessary.

A further object is to provide a pick-up wherein damping means is not inserted in the air gap between the pole pieces and armature, and wherein the pole pieces present unbroken surfaces to the armature.

Another object is to provide an electric pick-up device wherein the armature is quite free to swing from side to side, resulting in a reduction in the pressure necessarily exerted by a record to secure a sidewise deflection of the armature, resulting in less wear on the record.

An additional object is to provide an electric pick-up having great sensitivity.

A further important object of the invention is to provide a means to give the armature more stable balance than any heretofore made, such means further giving the necessary free balance to the armature.

Still another object is to provide a pick-up in which the damping means is given a standard size and which when coupled with the particular armature construction, provides a device which may be easily and quickly assembled, and wherein the armature may be accurately centered and locked in place, delay and expense incident to the balancing of bumper pads against one another in tests to determine whether or not they are too free, too stiff, properly centered, etc., being eliminated.

A further object is to provide a pick-up which may be manufactured and sold at low cost, the parts being so constructed that they may be easily and quickly assembled, and the pick-up itself being so sensitive that less expensive magnets than those usually employed may be used, and yet superior results obtained.

The invention is shown as applied to a well-known pick-up now on the market. However, it is to be understood that the invention is applicable to other forms and styles of pick-up, and that while in the following description the detailed construction, arrangement and operation will be given, the invention is not limited to the specific form shown, since many changes will suggest themselves to those skilled in the art, and reference must be therefore made to the appended claims to a definition of the limitation of the invention.

Referring to the drawings:

Figure 1 is a plan view of a pick-up a part of the arm or support therefor being shown;

Fig. 2 is a plan view of a pick-up disconnected from the arm and with its cover removed;

Fig. 3 is a front elevation of the pick-up shown in Fig. 2;

Fig. 4 is a longitudinal view taken along the line 4—4 of Fig. 2;

Fig. 5 is a transverse view taken along the line 5—5 of Fig. 2;

Fig. 6 is a plan view of the magnet and pole pieces, the armature and damping means being omitted;

Fig. 7 is a side view of the armature removed, a needle or stylus being shown in position;

Fig. 8 is a view taken at right angles to Fig. 7;

Fig. 9 is a view similar to Fig. 7 but showing a slightly modified form;

Fig. 10 is a view similar to Fig. 8 but showing the modified form;

Fig. 11 is a view similar to Fig. 8, but showing the armature used in the structure of Fig. 10; and Figs. 12 and 13 are diagrammatic views showing action of stiff and flexible reeds.

Referring in detail to the drawing, at 1 is shown the pick-up adapted to be mounted in a yoke such as that shown at 2 in Fig. 1, the yoke being carried by an arm 3 adapted to be mounted for swinging movement over a turntable or other structure carrying a record. The pick-up includes a base 4 on which is assembled the different parts, the base cooperating with the cover 5 (see Figs. 1, 3 and 9) to form a closure for the parts.

Mounted on the forward portion of the base is a permanent horseshoe magnet 6 between the arms of which are disposed pole pieces 7 and 8. The pole faces 9 and 10 incline upwardly and the pole faces 11 and 12 are concave. Disposed within the space between the pole pieces is an electromagnetic winding 13, in the form of a bobbin, the same being wound upon the support 14.

An armature is disposed within the winding 13 and comprises a body portion 15 having a head 16 substantially in the shape of a prism and as shown in the assembled view, this head is disposed in the air gap between the pole faces 9 and 10, and presents a surface to each pole face, which surface is substantially the area of the pole face. In this connection, it is to be noted that the upper pole pieces taper toward the faces 9 and 10 and that the pole faces are unbroken and are not spaced from the head 16 by blocks of rubber or the like. Further, the armature comprises a pair of bearing portions 17 and 18, the bearing portion 18 being hollow and internally screw threaded, whereby a clamp screw 19 may be used to clamp a stylus 20 in the socket 21, also formed in the armature. Bearings 17 and 18 are as shown, disposed between the pole faces 11, 12, a strip or sheet of rubber or other suitable substance being disposed about the bearings.

Secured in the head 16 and projecting upwardly therefrom, is a flexible reed or fin 22 of metal. To best serve its intended purpose, this reed should be highly flexible and we have found that a reed comprising a thin strip of brass is suitable for this purpose. However, our damping and adjusting means, to be described, is useful irrespective of whether or not the reed 22 is flexible and we therefore, do not limit the invention to a flexible spring reed.

As clearly shown in Figs. 3 and 5, reed 22 is embedded in a block or slab 23 of rubber or other vibration absorbing material, although soft rubber has been found to be highly satisfactory. It is clear that the block 23 is disposed within a housing, casing or carrier 24 suitably shaped to receive the block of rubber and having outwardly extending horizontal arms 25 and 26 provided with elongated openings 28 for the passage of screws 29. These elongated openings permit the housing and its contents, the block of rubber, to be shifted slightly one way or the other, so as to center the armature head 16 in the air gap between the pole faces 9 and 10.

Rearwardly of the permanent magnet 6 and also mounted on the base 4 is a block 30 carrying contacts 31 and having sockets 32 to receive plugs 33 attached to the wires 34, leading to any amplifying system. Wires 35 connect contacts 31 to the winding 13.

In Fig. 10 a reed 36 is shown attached to the armature head 16, this reed being in the form of a T, its upper arms 37 and head 38 extending in opposite directions and being held against the top of the casing 24 by means of the block 23. These arms extend into contact with the side walls of the casing. In Fig. 11, this reed is shown with its armature, dis-associated from the remainder of the pick-up. Fig. 12 shows the application of the rubber block and housing to a more or less rigid fin or reed and graphically illustrates the unequal rubber compression resulting from the use of such a reed or fin. While the results obtained through the use of a more or less rigid fin or reed are not as good as when a highly flexible spring is used the single piece rubber dampener and the housing are extremely useful in this association since adjustment of the armature into a position midway between the pole pieces may be easily made and since other beneficial results follow as are later described. Therefore, wherever the word reed is used in the claims it is intended that the word shall cover an extension which may be either rigid or highly flexible.

Fig. 13 shows the compression resulting in the use of the flexible spring. Considering the operation of the device of Fig. 13, it is to be noted that there is in effect, two fulcrum points for the armature, a fixed fulcrum point formed by the bearing 17 and 18 and a floating fulcrum point formed at the juncture of the armature head 16 and the reed 22. The greatest flexing of the reed or spring 22 takes place adjacent the head of the armature at the lower surface of the rubber block.

In making this invention, it was desired to provide a balancing force which would to some extent depend on a metallic part. Metal springs such as would be necessary to give the desired free balance to the pick-up armature would not damp motion. Damping of the motion is necessary to improve the frequency character, and in the present instance, damping is accomplished by surrounding a balancing spring or rigid or substantially rigid fin with rubber in such a manner that normal vibrations will not be heavily damped but excessive vibrations causing the spring or reed 22 (Figs. 1 through 8) or 36 (Figs. 9 and 10) to vibrate violently, will be damped in accordance with the amplitude of their motion.

The structure shown in Figs. 10 and 11 has been found not quite as efficient as that shown in the remainder of the figures. This is due to the fact that vibrations are apt to pass through the spring or reed to the point of contact in the supporting housing and reflect back again without completely losing their energy in rubber. However, this structure (Figs. 10 and 11) has many advantages.

With the structure shown in Figs. 1 through 8, where the reed or spring 22 has its free end imbedded in the rubber so as to float therein, the vibrations passing through the reed or fin are completely lost in the rubber.

A further advantage is due to the fact that the large mass of rubber is only under a slight pressure, the force necessary to maintain the armature in balance being not sufficient to cause permanent deformation of the rubber. Formerly, there have been structures using a thread or membrane of rubber about $\frac{1}{16}$ inch square which after some use is permanently reduced to about $\frac{1}{32}$ inch in thickness. With the present structure, a much larger section or block of rubber is used. This keeps the stress in the rubber below the point where permanent deformation takes place. In addition, due to the fact that a larger area is present for damping effect, it is not necessary to drive the molecules of rubber through such a large hysteresis loop. Reducing the size of the hysteresis loop also tends to increase the life of the rubber.

A very important effect resulting from the present invention is that once a piece of rubber or other damping means of given material and size has been determined upon, no adjustment for compression is necessary. The only adjustment made with the rubber is to slide the container 24 back and forth to center the armature in the air gap. Should the pick-up subsequently become defective, it will not be due to failure in the rubber, but will be due to loosening of the screws which hold the container. To correct this, it is only necessary to recenter the armature by sliding the container or housing 24, and again tightening the screws.

Magnetic leakage is also reduced due to the present arrangement, since there are no slots in the pole faces 9 and 10 to receive damping material. This reduces flux leakage and makes possible the use of narrower pole pieces with a correspondingly lighter moving member.

A further advantage flowing from this structure is that the low unit pressure exerted by the rubber block 23 makes possible a more reliable adjustment. In turn, this makes it possible to have a balance allowing the armature to freely swing from side to side. Accordingly, wear on records is decreased, since the sidewise pressure necessary to secure a given sidewise deflection is also decreased.

Greater sensitivity is also obtained. The low sidewise force necessary for a given deflection of the armature causes less bending in the needlepoint and results in less motion of the entire pick-up and its supporting arm. Therefore, more of the vibratory motion of the record groove is transmitted to the top part of the armature, thus improving the sensitivity or efficiency of the pick-up. Heretofore, it has been readily possible to get a free balance with high sensitivity, but without stable adjustment. Further, it has been easy to obtain a sturdy adjustment at the sacrifice of sensitivity, and at the cost of wear on the records. With the present arrangement, low sidewise force and great sensitivity is obtained due to the use of the flexible reed and the block of soft rubber as a damping means.

In the present instance, owing to the fact that the rubber is compressed only to a low value, there is almost no chance of any deformation in the rubber. The result is a high degree of stability of adjustment. Moreover, the motion is transmitted from the armature to the rubber through a flexible member, and therefore, the stability of adjustment obtained by using a large mass of rubber is not attained at the expense of a free balance with its accompanying high sensitivity.

There is a certain advantage resulting from the placing of the rubber blocks 23 in a housing or casing 24. The rubber can be made sufficiently close to a selected standard so that a definite size of block and a casing or housing definitely dimensioned to fit it, may be chosen. Thus, instead of the necessity of balancing two pads one against the other, and test the balance to make sure it is not too free, nor too stiff and properly centered, it becomes only necessary to assemble the rubber into the housing or casing and position this assembly over the spring or reed and slide the assembly to one side or the other until the armature is accurately centered in the air gap, after which, the screws 29 are tightened.

Moreover, the rubber at each side of the fin or reed or spring, is the same. Since the rubber is centrally lanced, the same quantity will be at each side of the armature and the rubber at each side, being part of a single piece will be of the same quality, age, etc. Of course, it will be understood that the rubber need not necessarily be in one piece, it merely being desirable to use a construction employing this feature.

Having thus described our invention, what is claimed is:

1. In an electric phonograph pick-up, an armature mounted for rocking movement about a pivot, a flexible spring member projecting from said armature and damping means enclosing the end of said spring.

2. In an electric phonograph pick-up, an armature, a flexible spring member projecting from said armature, and damping means enclosing the free end of said spring.

3. In an electric phonograph pick-up, an armature, a pair of pole pieces disposed one at each side of said armature, an air gap between said pole pieces, said armature having a head disposed in said air gap, a spring member secured to the head of the armature and projecting outwardly of the air gap, and damping means engaging each side of the spring member.

4. In an electric phonograph pick-up, an armature, a pair of pole pieces disposed one at each side of the armature and having an air gap between them, said armature mounted for rocking movement about a substantially horizontal pivot and having a head disposed in said air gap, a spring member secured to said head and projecting upwardly therefrom out of said air gap and a damping means engaging each side of said spring beyond the air gap.

5. In an electric phonograph pick-up, an armature, a pair of pole pieces disposed one at each side of the armature and having an air gap between them, said armature mounted for rocking movement about a substantially horizontal pivot and having a head disposed in said air gap, a spring member secured to said head and projecting upwardly therefrom out of said air gap, and a damping means engaging each side of said spring beyond the air gap, said damping means at its under side engaging the upper surface of said pole pieces.

6. In an electric phonograph pick-up, an armature, a pair of pole pieces disposed one at each side of the armature and having an air gap between them, said armature mounted for rocking movement about a substantially horizontal pivot and having a head disposed in said air gap, a spring member secured to said head and projecting upwardtherefrom out of said air gap and a damping means engaging each side of said spring beyond the air gap, said damping means enclosing the upper end of said spring.

7. In an electric phonograph pick-up, an armature, a pair of pole pieces disposed one at each side of the armature and having an air gap between them, said armature mounted for rocking movement about a substantially horizontal pivot and having a head disposed in said air gap, a spring member secured to said head and projecting upwardly therefrom out of said air gap, and a damping means engaging each side of said spring beyond the air gap, said damping means comprising a block of rubber.

8. In an electric phonograph pick-up, an armature, a pair of pole pieces disposed one at each side of the armature and having an air gap between them, said armature mounted for rocking movement about a substantially horizontal pivot and having a head disposed in said air gap, a spring member secured to said head and projecting upwardly therefrom out of said air gap, damping means engaging said spring, said damping means comprising a block of rubber into which the free end of said spring is embedded.

9. In an electric phonograph pick-up, an armature, a pair of pole pieces disposed one at each side of the armature and having an air gap between them, said armature mounted for rocking movement about a substantially horizontal pivot and having a head disposed in said air gap, a spring member secured to said head and projecting upwardly therefrom out of said air gap, and damping means engaging each side of said spring beyond the air gap, and a housing enclosing said damping means and means to secure the housing in place.

10. In an electric phonograph pick-up, an armature, a pair of pole pieces disposed one at each side of the armature and having an air gap between them, said armature mounted for rocking movement about a substantially horizontal pivot and having a head disposed in said air gap, a spring member secured to said head and projecting upwardly therefrom out of said air gap, a damping means, said damping means comprising a block of rubber into which the free end of said spring is embedded, and a housing for said block and means for securing the housing in place.

11. A device as in claim 9, said housing being laterally adjustable to center the armature in the air gap.

12. A device as in claim 10, said housing being laterally adjustable to center the armature in the air gap.

13. In an electric phonograph pick-up, an armature, a pair of pole pieces disposed one at each side of the armature and having an air gap between them, said armature mounted for rocking movement and having a head disposed in said air gap, a reed rigid at one end with said head and projecting therefrom out of said air gap, and a damping means comprising a block of rubber engaging each side of said reed beyond the air gap, said damping means at one of its sides engaging the surfaces of the pole pieces.

14. In an electric phonograph pick-up, an armature, a pair of pole pieces disposed one at each side of the armature and having an air gap between them, said armature mounted for rocking movement and having a head disposed in said air gap, a reed like extension of said armature projecting out of said air gap, and a damping means comprising a block of rubber engaging each side of said reed beyond the air gap, said damping means at one of its sides engaging the surfaces of the pole pieces.

15. In an electric phonograph pick-up, an armature, a pair of pole pieces disposed one at each side of said armature and having an air gap between them, said armature mounted for rocking movement about a pivot and having a head disposed in said air gap, a reed rigid at one end with said head and projecting therefrom out of said air gap, damping means engaging said reed beyond the air gap, said damping means comprising a block of rubber lanced to clampingly receive the end of the reed, a housing on the pole extensions and embracing the side walls of said damping means and adjustable to move the damping means at each side of the armature simultaneously to center the head of the armature in the air gap, and means to secure the housing to the pole pieces to maintain the housing in adjusted position.

16. In an electric phonograph pick-up, an armature, a pair of pole pieces disposed one at each side of said armature and having an air gap between them, said armature mounted for rocking movement and having a portion disposed in said air gap, a reed rigid at one end with said armature and projecting out of the air gap, a damping means engaging said reed beyond the air gap, a housing on said pole pieces and embracing the side walls of the damping means and adjustable to move the damping means at each side of the armature simultaneously to center the armature in the air gap, said housing including a laterally extending flange having an elongated slot and means passing through said slot in the flange of the housing to secure the housing to the pole pieces with the housing in adjusted position.

17. In an electric phonograph pick-up, an armature, a pair or pole pieces disposed one at each side of the armature and having an air gap between them, said armature mounted for rocking movement, a flat reed or fin at one end rigid with said armature, said reed or fin disposed entirely outside said air gap, and damping means engaging said reed or fin, said damping means comprising a block of rubber into which the free end of the reed extends.

18. In an electric phonograph pick-up, an armature, a pair of pole pieces disposed one at each side of the armature and having an air gap between them, said armature mounted for rocking movement, a reed or fin at one end rigid with said armature, said reed or fin disposed entirely outside said air gap, and damping means engaging said reed or fin, said damping means comprising a block or rubber into which the entire reed is embedded and by which the entire reed is enclosed.

19. In an electric phonograph pick-up, an armature, a pair of pole pieces disposed one at each side of the armature and having an air gap between them, said armature mounted for rocking movement and having a part disposed in said air gap, a flat reed or fin at one end rigid with said armature and projecting outwardly of the air gap, damping means engaging each flat side of said reed, and said damping means comprising a deep soft block of rubber presenting a flat surface to each flat side of the reed.

Signed at New York, New York, this 30th day of July, 1930.

FRANK L. CAPPS.
HARRY A. SUMMERS.